US010173331B2

(12) United States Patent
Akaha

(10) Patent No.: US 10,173,331 B2
(45) Date of Patent: Jan. 8, 2019

(54) ROBOT SYSTEM

(71) Applicant: Seiko Epson Corporation, Tokyo (JP)

(72) Inventor: Kazushige Akaha, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/078,238

(22) Filed: Mar. 23, 2016

(65) Prior Publication Data

US 2016/0288339 A1 Oct. 6, 2016

(30) Foreign Application Priority Data

Mar. 31, 2015 (JP) ................................ 2015-071201

(51) Int. Cl.

*B25J 21/00* (2006.01)
*B25J 9/16* (2006.01)
*B25J 9/00* (2006.01)
*B25J 9/04* (2006.01)

(52) U.S. Cl.

CPC ............ *B25J 21/00* (2013.01); *B25J 9/0018* (2013.01); *B25J 9/046* (2013.01); *B25J 9/162* (2013.01); *B25J 9/0009* (2013.01); *G05B 2219/31075* (2013.01); *G05B 2219/31076* (2013.01); *G05B 2219/40298* (2013.01); *Y10S 901/14* (2013.01); *Y10S 901/49* (2013.01)

(58) Field of Classification Search

CPC . B25J 21/00; B25J 9/0009; B25J 9/162; B25J 9/046; B25J 9/0018; G05B 2219/31076; G05B 2219/31075; G05B 2219/40298; Y10S 901/49; Y10S 901/14

See application file for complete search history.

(56) References Cited

U.S. PATENT DOCUMENTS 6,105,454 A * 8/2000 Bacchi .................... B25J 9/042 414/744.5
6,274,839 B1 * 8/2001 Stone ...................... B23K 9/04 219/125.1
6,558,107 B1 * 5/2003 Okuno .................... B25J 9/107 414/744.5
6,772,932 B1 * 8/2004 Halstead ........... B23K 37/0235 219/125.1

(Continued)

FOREIGN PATENT DOCUMENTS

JP 59-232779 A 12/1984
JP 09-141592 A 6/1997
JP 2014-180723 A 9/2014

*Primary Examiner* — Jason Holloway
(74) *Attorney, Agent, or Firm* — Harness, Dickey & Pierce, P.L.C.

(57) ABSTRACT

A robot system includes a robot cell that includes a robot and a cell in which the robot is provided and enables coexistence with a human, and an installation area of the robot cell is less than 637,500 $mm^2$ and the robot cell is movable. Further, the robot includes an n-th (n is an integer number equal to or more than one) arm rotatable about an n-th rotation shaft and an (n+1)th arm provided on the n-th arm rotatably about an (n+1)th rotation shaft in a shaft direction different from a shaft direction of the n-th rotation shaft, and a length of the n-th arm is longer than a length of the (n+1)th arm and the n-th arm and the (n+1)th arm can overlap as seen from the (n+1)th rotation shaft.

9 Claims, 13 Drawing Sheets

(56) References Cited

U.S. PATENT DOCUMENTS

| | | | | |
|---|---|---|---|---|
| 6,859,683 | B2 * | 2/2005 | Parker | B25J 19/023 318/567 |
| 7,021,173 | B2 * | 4/2006 | Stoianovici | B25J 9/06 74/490.03 |
| 7,591,078 | B2 * | 9/2009 | Crampton | B25J 13/088 33/503 |
| 8,006,891 | B2 * | 8/2011 | Osicki | B23K 9/173 219/125.1 |
| 8,327,531 | B2 * | 12/2012 | Ono | B23P 21/004 29/429 |
| 9,073,220 | B2 * | 7/2015 | Meyerhoff | B25J 9/044 |
| 9,158,299 | B2 * | 10/2015 | Kouno | B25J 9/0084 |
| 9,452,500 | B2 * | 9/2016 | Reid | B23P 21/004 |
| 9,629,682 | B2 * | 4/2017 | Wallace | A61B 34/76 |
| 2003/0221504 | A1 * | 12/2003 | Stoianovici | B25J 9/06 74/490.04 |
| 2008/0222883 | A1 * | 9/2008 | Ono | B23P 21/004 29/787 |
| 2008/0235970 | A1 * | 10/2008 | Crampton | B25J 13/088 33/503 |
| 2009/0007713 | A1 * | 1/2009 | Meyerhoff | B25J 9/044 74/490.01 |
| 2011/0258847 | A1 * | 10/2011 | Meisho | B23P 19/00 29/700 |
| 2012/0090422 | A1 * | 4/2012 | Meyerhoff | B25J 9/044 74/490.01 |
| 2013/0123983 | A1 * | 5/2013 | Brogårdh | B25J 9/162 700/254 |
| 2013/0205931 | A1 * | 8/2013 | Meyerhoff | B25J 9/044 74/490.01 |
| 2014/0199149 | A1 * | 7/2014 | Meyerhoff | B25J 9/044 414/744.5 |
| 2014/0271061 | A1 * | 9/2014 | Fukuda | B23Q 7/14 414/226.05 |
| 2014/0277713 | A1 * | 9/2014 | Kouno | B25J 9/0084 700/248 |
| 2014/0288706 | A1 * | 9/2014 | Asahi | B25J 9/1656 700/250 |
| 2015/0266147 | A1 * | 9/2015 | Reid | B23P 21/004 29/525.01 |
| 2016/0318179 | A1 * | 11/2016 | Komatsu | B25J 9/0018 |
| 2016/0318191 | A1 * | 11/2016 | Murakami | B25J 9/0018 |
| 2016/0325400 | A1 * | 11/2016 | Murakami | B25J 21/00 |

* cited by examiner 73
70
500

50(100)
50
(100)

81
811a 811b
742
742
1
11
50
100
513
741
70
742
73
742
811a 811b
81
53
525

100
111
11
513
1
531
50
5
53
12
14
13
15
16
17
91
811b
(81)
70
741
73
521
52
742
742
525
54
811b
(81)
54

742
742
822
(82)
1
11
50
100
513
741
70
742
73
742
822
(82)
53
525

100
11
513
1
111
531
50
5
53
12
14
13
82
15
16
821
822
17
70
91
741
73
521

52
742
742
54
525
54

ROBOT SYSTEM

BACKGROUND

1. Technical Field

The present invention relates to a robot system.

2. Related Art

In related art, robots with robot arms are known. In the robot arm, a plurality of arms (arm members) are coupled via joint parts and, as an end effector, such as a hand is attached to the arm on the most distal end side (on the most downstream side). The joint parts are driven by motors and the arms rotate by the driving of the joint parts. Then, for example, the robot grasps an object with the hand, moves the object to a predetermined location, and performs predetermined work such as assembly.

As the robot, Patent Document 1 (JP-A-2014-180723) discloses a dual-arm robot having a plurality of arms. Further, Patent Document 1 discloses a robot cell having the dual-arm robot and a cover that covers the dual-arm robot. Furthermore, Patent Document 1 discloses that a manufacturing line can be formed by arrangement of a plurality of the robot cells.

As described above, the manufacturing line can be formed by the robot cells, and accordingly, in a production line in which humans work, replacement of the humans by the robot cells has been recently required.

However, generally, installation spaces for installation of robot cells are larger than work spaces of humans, and major changes to the entire manufacturing line of upsizing the entire manufacturing line is required for replacement of humans by robot cells. Accordingly, for example, for replacement of humans by robots with changes of models of products to be manufactured, the entire manufacturing line should be changed and there is a problem that effort (specifically, cost and time) is taken for the changes.

SUMMARY

An advantage of some aspects of the invention is to provide a robot system that facilitates replacement of humans by robot cells.

The invention can be implemented as the following forms or application examples.

Application Example 1

A robot system according to this application example of the invention includes a robot cell including a robot and a cell in which the robot is provided, wherein an installation area of the robot cell is less than 637,500 $mm^2$, and the robot cell is movable.

The installation area is equal to or less than the size of the work area in which a human works, and thus, replacement of the human by the robot cell may be easily performed. Accordingly, the manufacturing line may be changed by replacement of a human by the robot cell without the major change such as change of the entire manufacturing line.

Application Example 2

In the robot system according to the application example of the invention, it is preferable that the robot includes an n-th (n is an integer number equal to or more than one) arm rotatable about an n-th rotation shaft, and an (n+1)th arm provided on the n-th arm rotatably about an (n+1)th rotation shaft in a shaft direction different from a shaft direction of the n-th rotation shaft, and a length of the n-th arm is longer than a length of the (n+1)th arm and the n-th arm and the (n+1)th arm can overlap as seen from the (n+1)th rotation shaft.

With this configuration, the space for preventing the robot from interfering may be made smaller when the distal end of the (n+1)th arm is moved to a position different by 180° about the n-th rotation shaft. Thus, the cell may be downsized. Accordingly, even in the above described installation area of the robot cell, the interference of the robot with the cell may be further suppressed in the movement.

Application Example 3

In the robot system according to the application example of the invention, it is preferable that the robot includes a base provided in the cell, and the n-th arm is provided on the base.

With this configuration, the n-th arm and the (n+1)th arm may be rotated with respect to the base.

Application Example 4

In the robot system according to the application example of the invention, it is preferable that the installation area is less than 500,000 $mm^2$.

With the installation area, the replacement of the human by the robot cell may be performed more easily. Accordingly, the manufacturing line may be changed more easily by replacement of the human by the robot cell without the major change such as change of the entire manufacturing line.

Application Example 5

In the robot system according to the application example of the invention, it is preferable that an installation area of the robot cell is less than 400,000 $mm^2$.

With the installation area, the replacement of the human by the robot cell may be performed more easily. Accordingly, the manufacturing line may be changed more easily by replacement of the human by the robot cell without the major change such as change of the entire manufacturing line.

Application Example 6

In the robot system according to the application example of the invention, it is preferable that a positioning part that determines a position of the robot cell with respect to a target installation position of the robot cell is provided in the robot cell.

With this configuration, the placement of the robot cell in the target installation position may be easily performed. Accordingly, the replacement of the human by the robot cell may be performed more easily.

Application Example 7

In the robot system according to the application example of the invention, it is preferable that a movement mechanism that moves the robot cell, and a movement control unit that controls driving of the movement mechanism are provided.

With this configuration, the robot cell may be automatically moved and the robot cell may be placed in the target installation position more easily. Accordingly, the replacement of the human by the robot cell may be performed more easily.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot system according to the invention will be explained in detail based on preferred embodiments shown in the accompanying drawings.

First Embodiment

Figure 1:
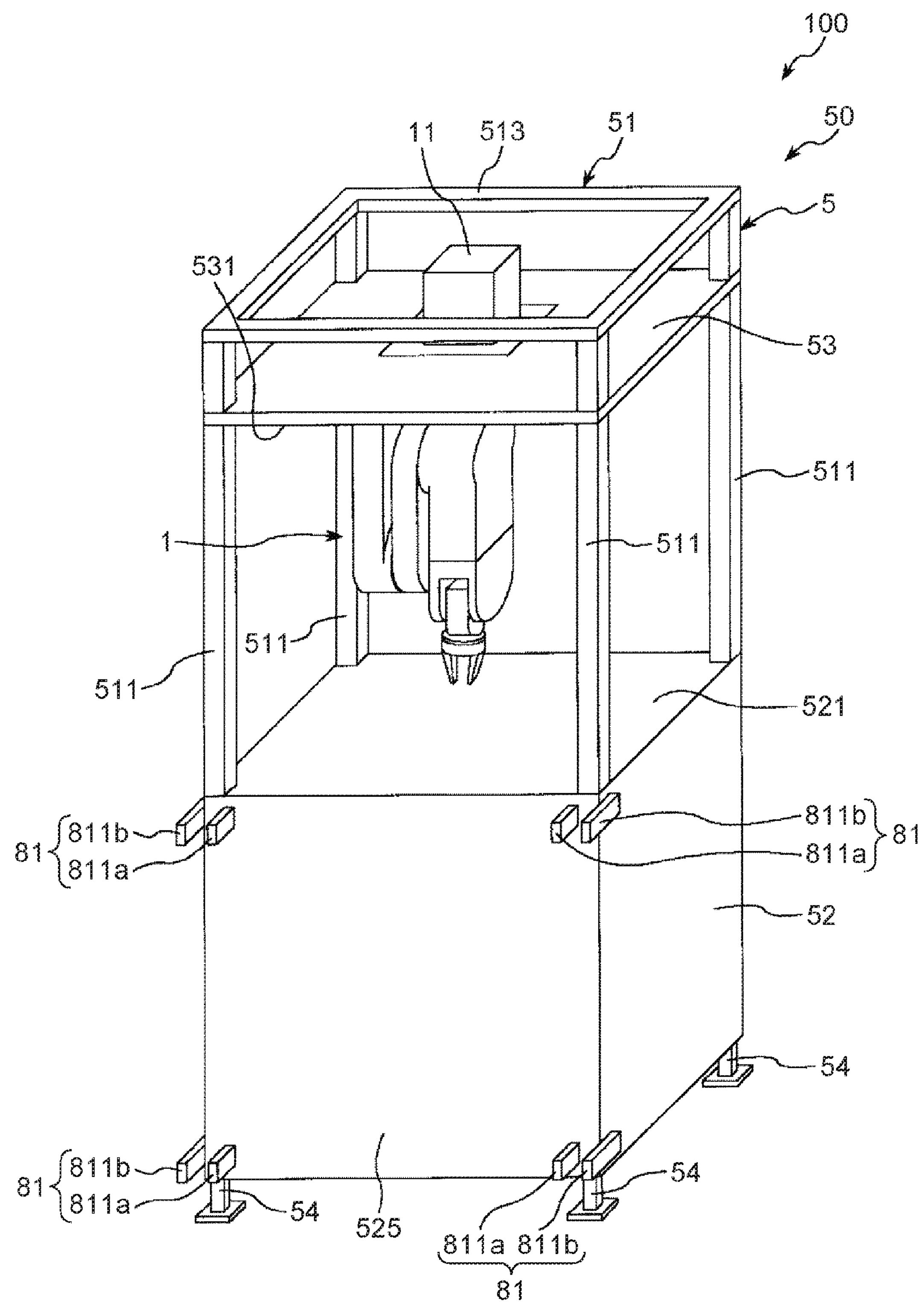
FIG. 1 is a perspective view showing the first embodiment of a robot system according to the invention.
Figure 2:
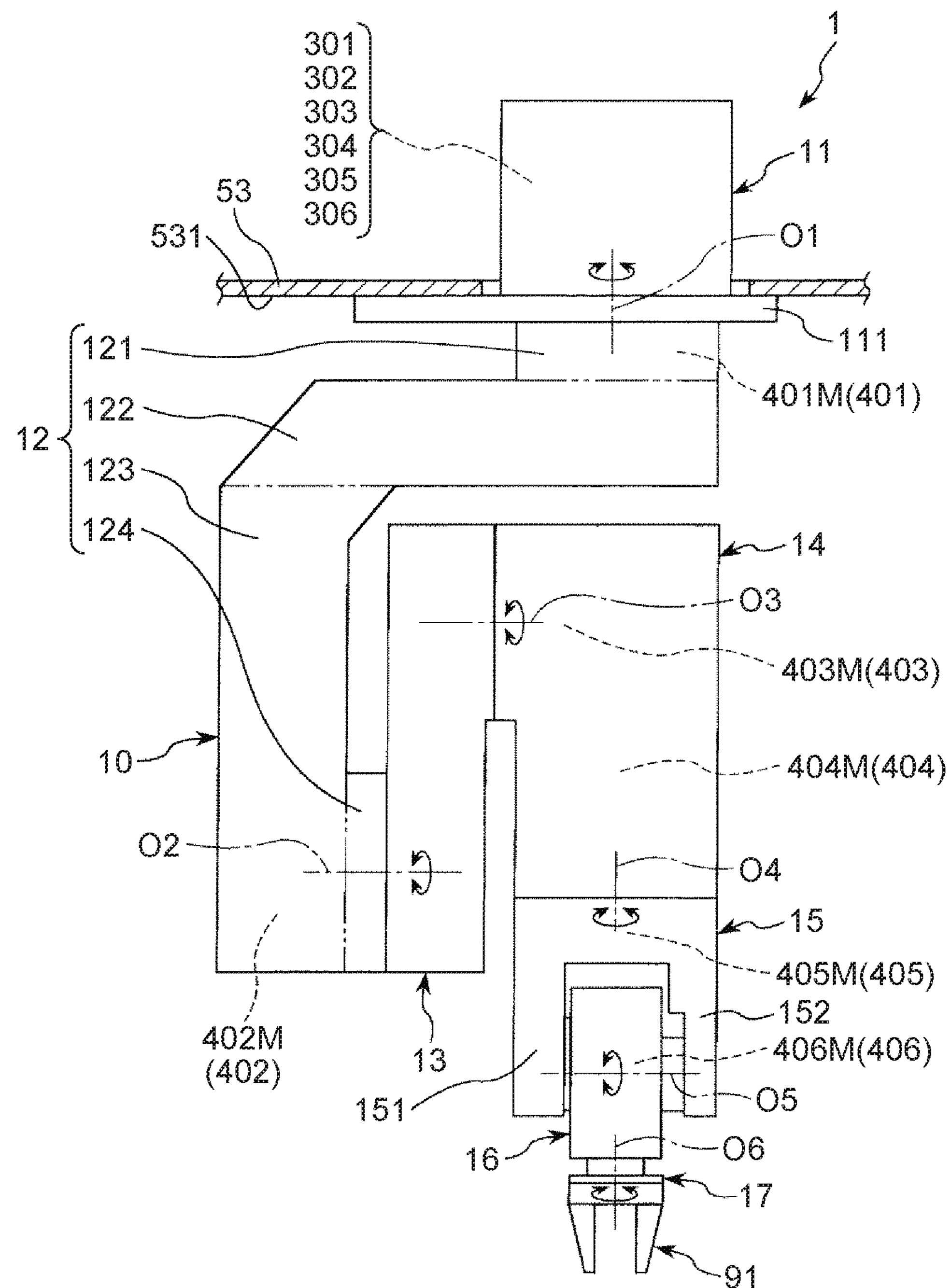
FIG. 2 is a front view of a robot shown in FIG. 1.
Figure 3:
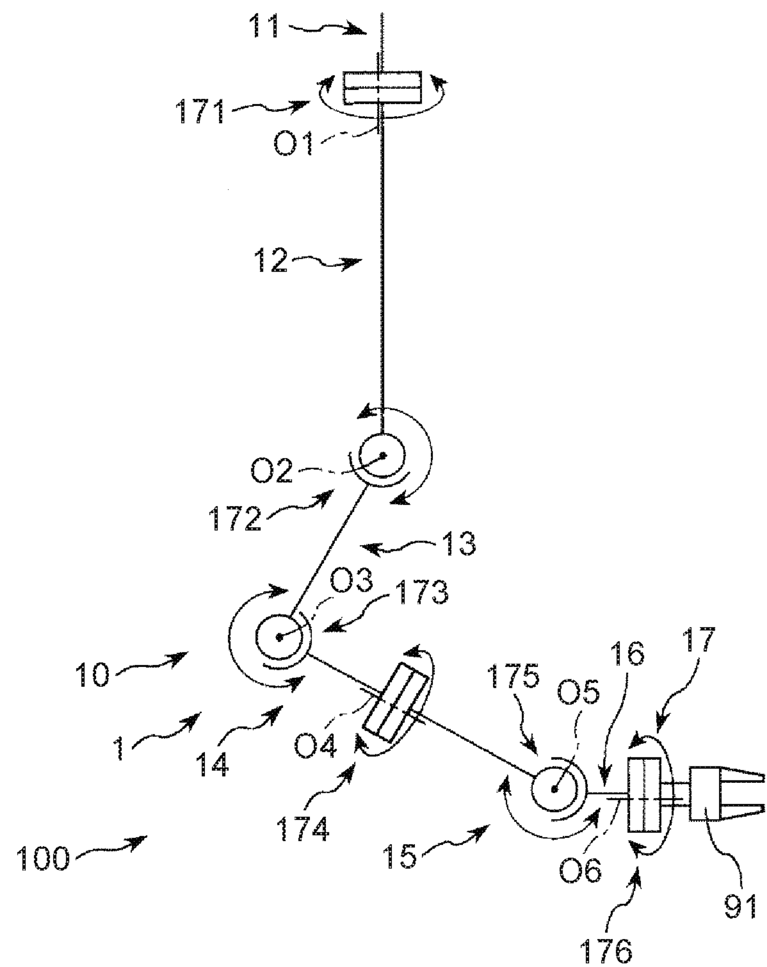
FIG. 3 is a schematic diagram of the robot shown in FIG. 1.
Figure 4:
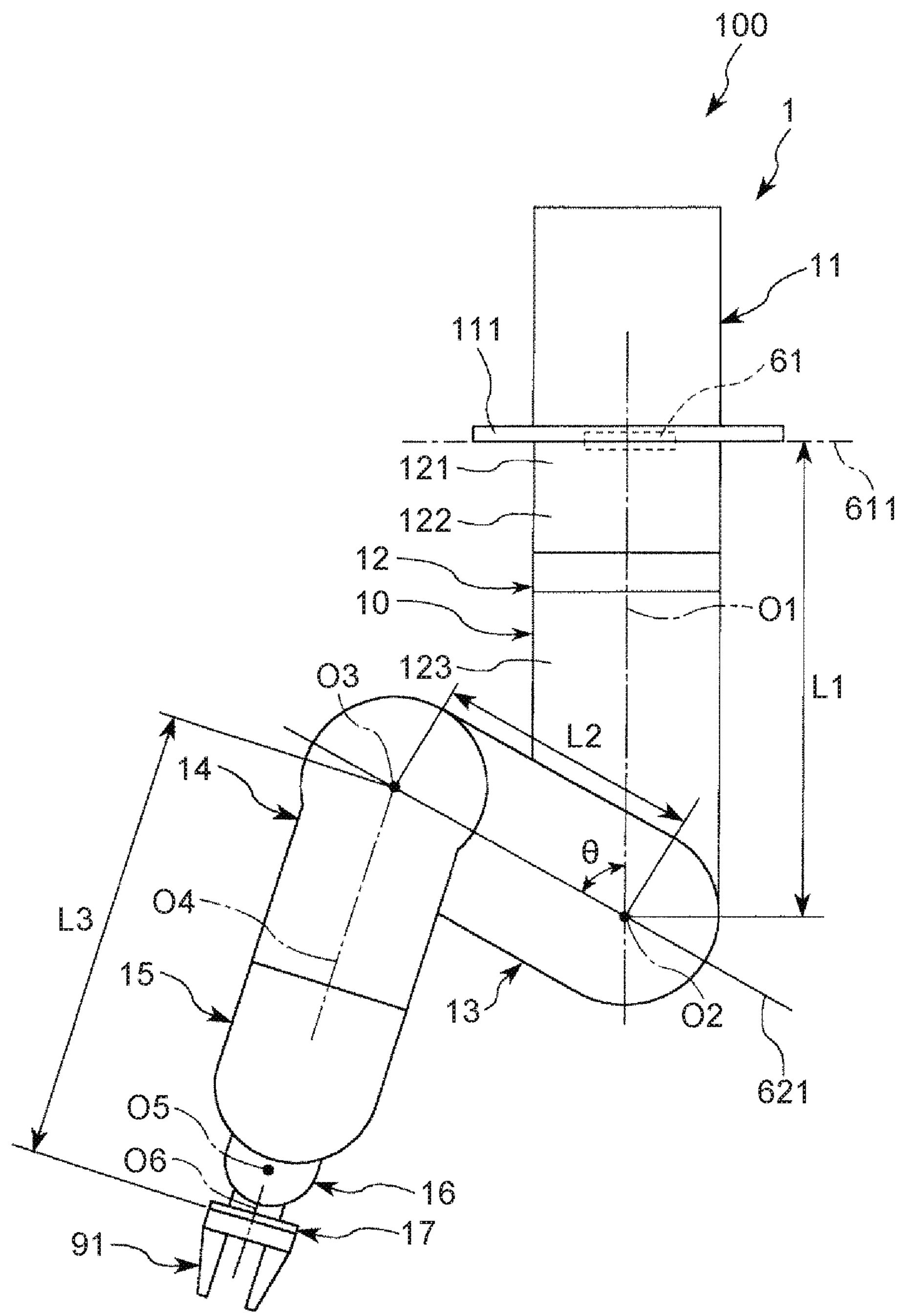
FIG. 4 is a side view of the robot shown in FIG. 1.
Figure 5:
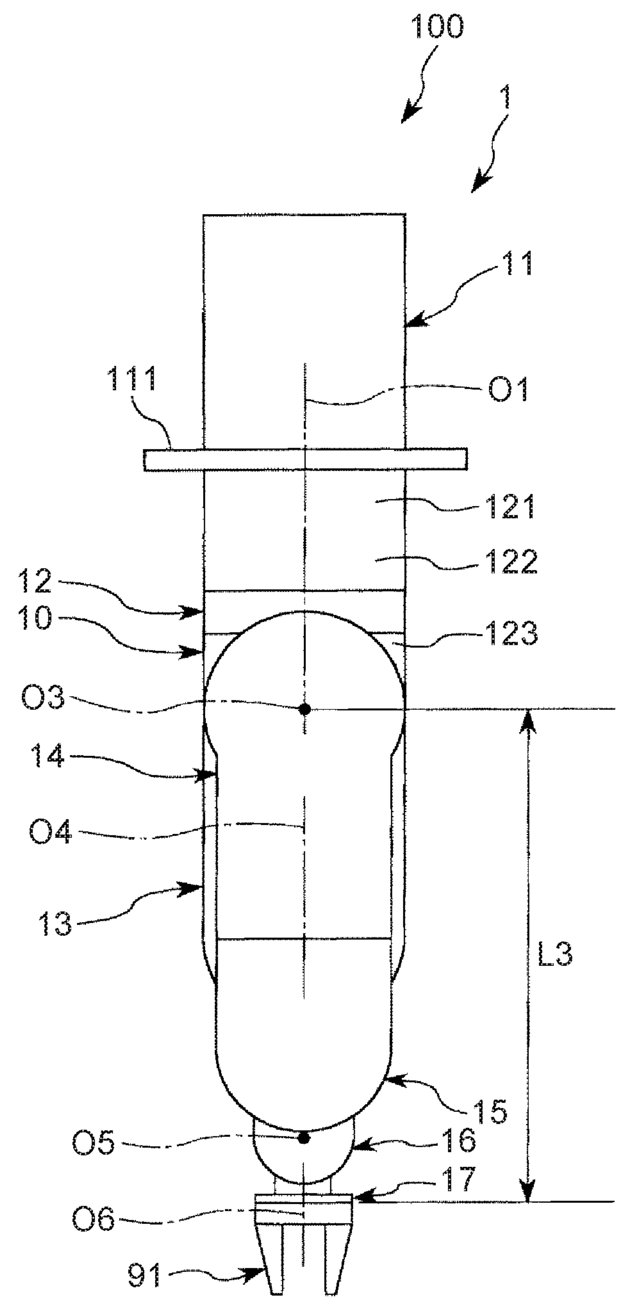
FIG. 5 is a side view of the robot shown in FIG. 1.
Figure 7:
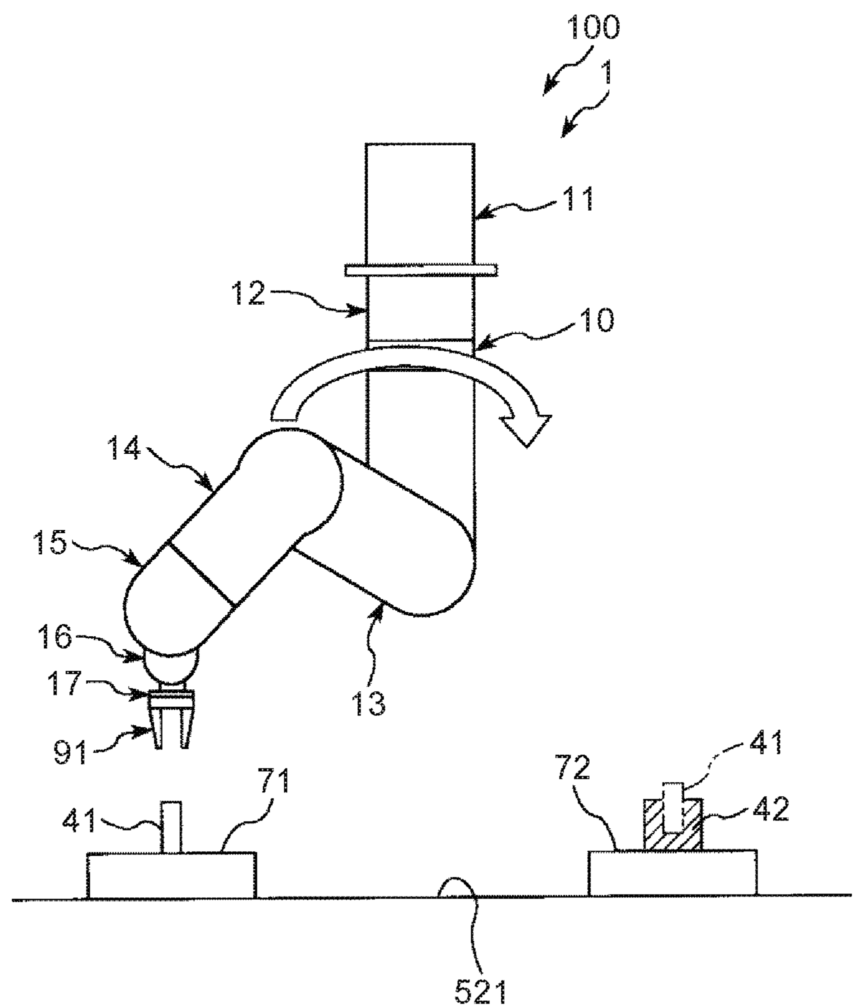
FIG. 7 is a diagram for explanation of actions of the robot shown in FIG. 1 at work.
Figure 8:
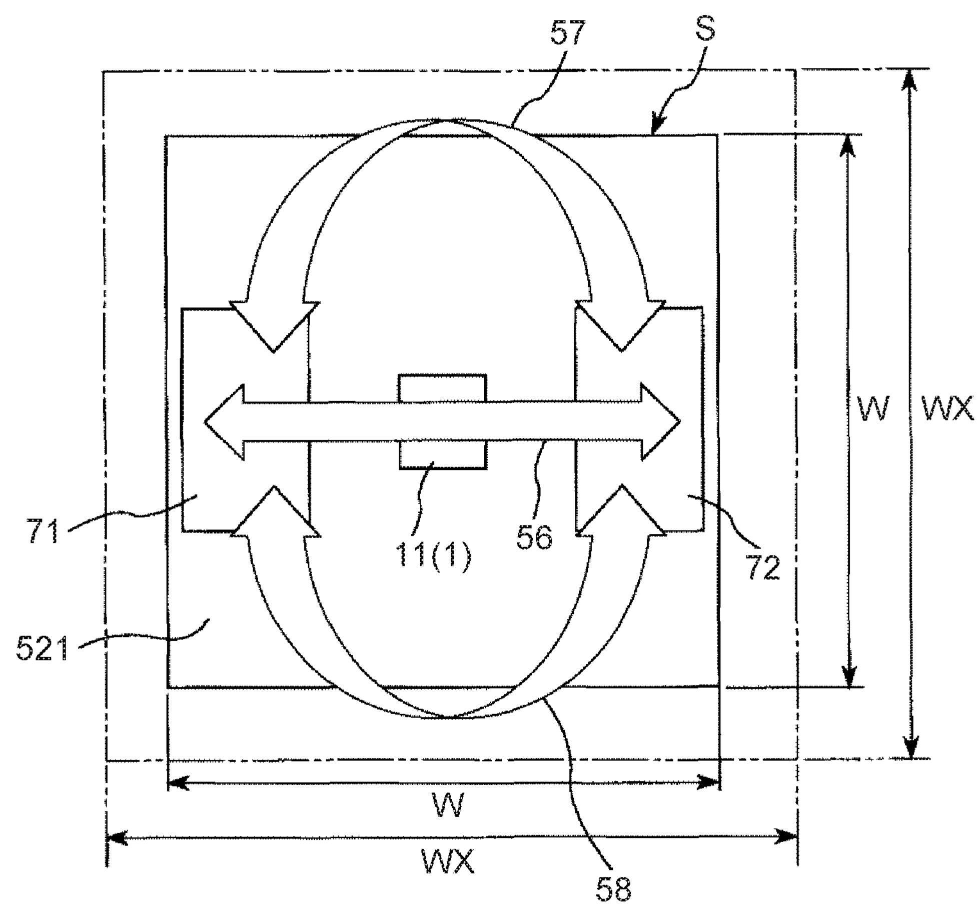
FIG. 8 shows movement paths of a distal end of a robot arm of the robot shown in FIG. 1.
Figure 9B:
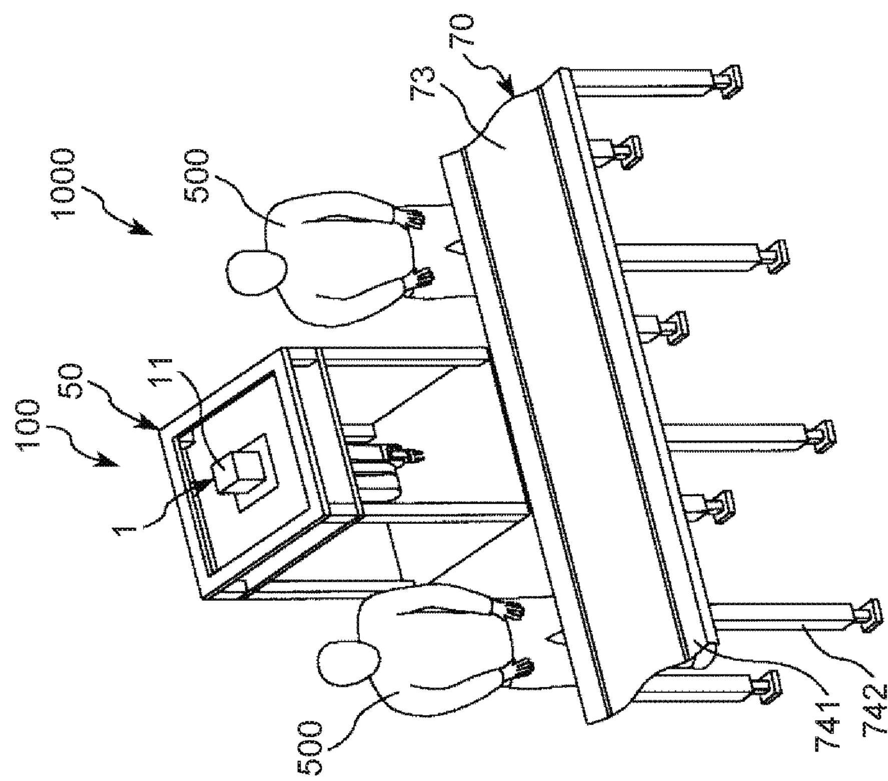
FIGS. 9A and 9B show parts of examples of manufacturing lines using the robot system shown in FIG. 1.
Figure 9A:
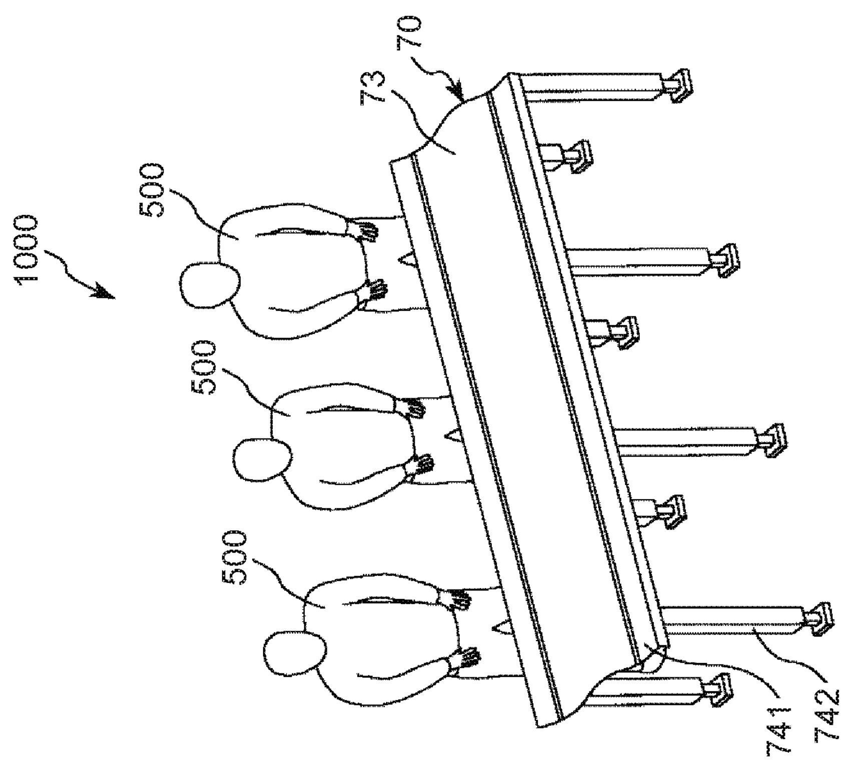
Figures 10A, 10B:
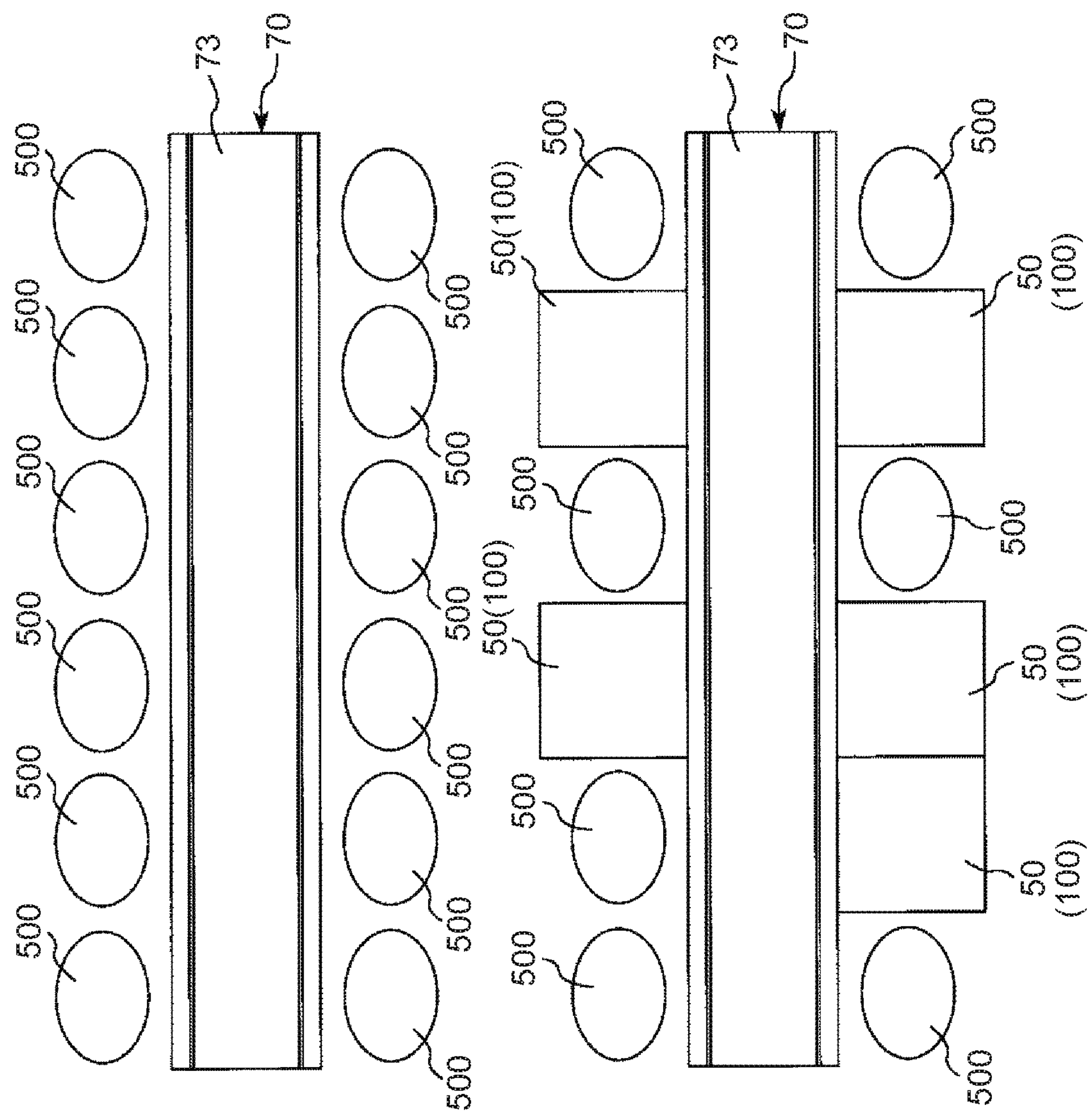
FIGS. 10A and 10B show parts of examples of manufacturing lines using the robot system shown in FIG. 1.
Figure 11:
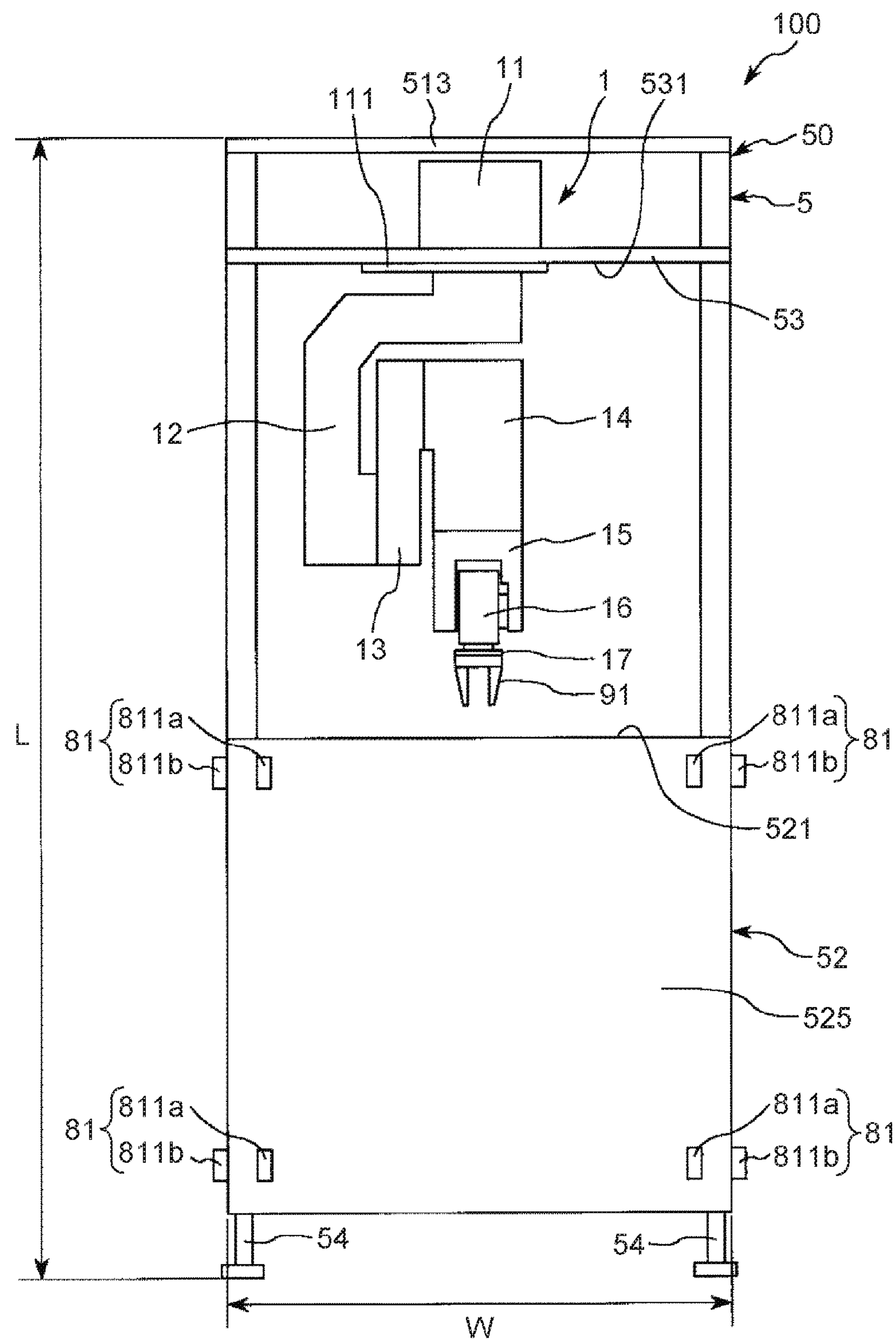
FIG. 11 is a front view of the robot system shown in FIG. 1.
Figure 12A:
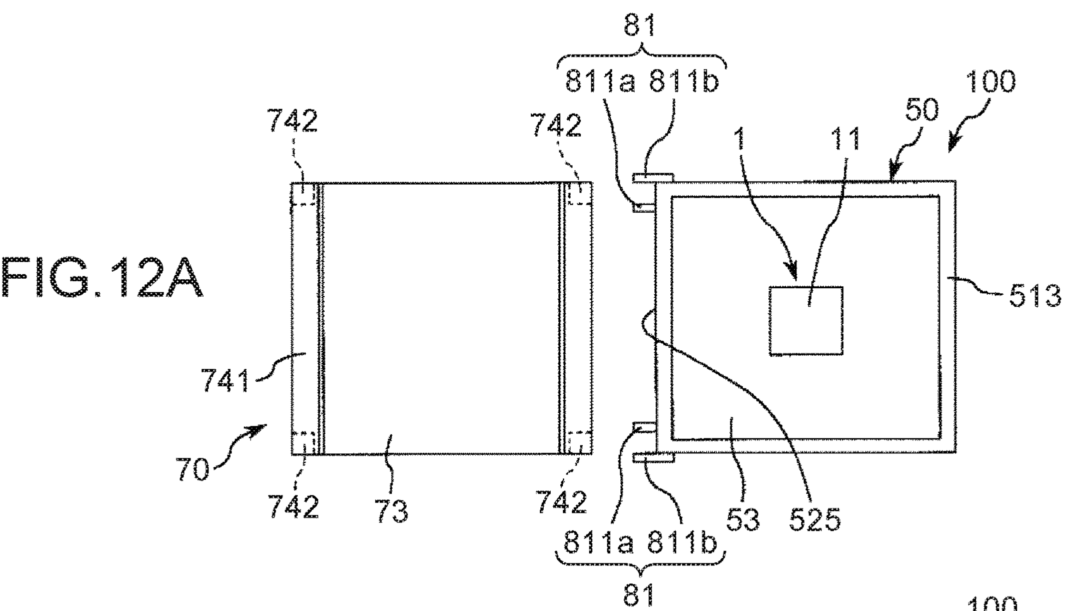
FIGS. 12A and 12B are diagrams for explanation of a positioning part provided in the robot cell shown in FIG. 1.
Figure 12B:
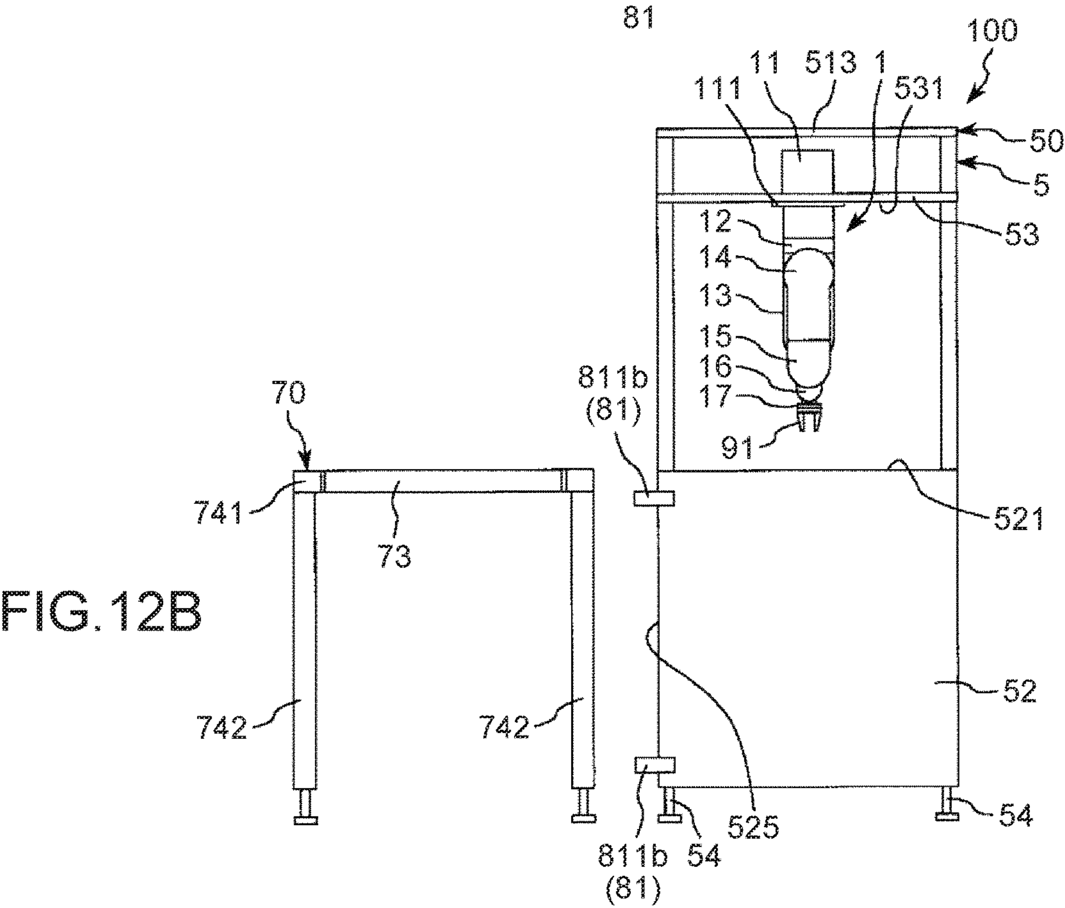

FIG. 1 is a perspective view showing the first embodiment of the robot system according to the invention. FIG. 2 is a front view of a robot shown in FIG. 1. FIG. 3 is a schematic diagram of the robot shown in FIG. 1. FIGS. 4 and 5 are side views of the robot shown in FIG. 1. FIGS. 6A to 6E are diagrams for explanation of actions of the robot shown in FIG. 1. FIG. 7 is a diagram for explanation of actions of the robot shown in FIG. 1 at work. FIG. 8 shows movement paths of a distal end of a robot arm of the robot shown in FIG. 1. FIGS. 9A and 9B show parts of examples of manufacturing lines using the robot system shown in FIG. 1. FIGS. 10A and 10B show parts of examples of manufacturing lines using the robot system shown in FIG. 1. FIG. 11 is a front view of the robot system shown in FIG. 1. FIGS. 12A and 12B are diagrams for explanation of a positioning part provided in a robot cell shown in FIG. 1. FIG. 12A shows a top view and FIG. 12B shows a side view.

Hereinafter, for convenience of explanation, the upside in FIGS. 1 to 7, FIG. 11, and FIG. 12B is referred to as "up" or "upper" and the downside is referred to as "low" or "lower" (the same applies to FIG. 13B of the second embodiment). Further, the base side in FIGS. 1 to 7, FIG. 11, and FIG. 12B is referred to as "proximal end" or "upstream" and the opposite side (the hand side) is referred to as "distal end" or "downstream" (the same applies to FIG. 13B of the second embodiment). Furthermore, the upward and downward directions in FIGS. 1 to 7, FIG. 11, and FIG. 12B are "vertical directions" and the leftward and rightward directions are "horizontal directions" (the same applies to FIG. 13B of the second embodiment).

A robot system 100 shown in FIG. 1 includes a robot cell 50 having a cell 5 and a robot 1.

For example, the robot system 100 may be used in a manufacturing process of manufacturing precision apparatuses such as wristwatches or the like. Further, the robot 1 may perform respective work of feeding, removing, carrying, and assembly of the precision apparatuses and parts forming the apparatuses.

Further, the robot system 100 has a robot control apparatus (control unit) (not shown). The robot control apparatus may be provided within the cell 5 or provided inside the robot 1, or separated from the robot cell 50. The robot control apparatus may be formed using, for example, a personal computer (PC) containing a CPU (Central Processing Unit) or the like.

Cell

As shown in FIG. 1, the cell 5 is a frame body surrounding the robot 1, movably formed, and easily relocated. Within the cell 5, mainly, the robot 1 performs work of assembly or the like.

The cell 5 has four foot parts 54 for installation of the entire cell 5 in an installation space of, for example, the ground (floor) or the like, a workbench (bench part) 52 supported by the foot parts 54, a frame body part 51 provided on the workbench 52, and a ceiling part 53 provided in the upper part within the frame body part 51.

The upper surface of the workbench 52 is opposed to the ceiling part 53, and serves as a work surface 521 on which the robot 1 may perform work of feeding, removing, or the like of the parts.

The frame body part 51 is provided on the work surface 521. The frame body part 51 has four posts (pillars) 511 extending in the vertical directions, and a frame-shaped upper portion 513 provided on the upper ends of the four posts 511. Note that safety plates (not shown) or the like may be provided between the adjacent posts 511 (the side surface parts of the frame body part 51) and the upper portion 513 for preventing, for example, workers and foreign matter such as dust from entering the frame body part 51.

Further, the ceiling part (attachment part) 53 is provided below the upper portion 513. The ceiling part 53 is a member that supports the robot 1 and has a square plate shape (frame shape) in the embodiment. The four corners of the ceiling part 53 are supported by the four posts 511 of the frame body part 51. The lower surface of the ceiling part 53 is a ceiling surface (attachment surface) 531, and a base 11 of the robot 1, which will be described later, is supported by the ceiling surface 531.

In the above description, the robot 1 is attached to the ceiling part 53, however, the robot 1 may be attached to, for example, the upper portion 513. In this case, the lower surface or upper surface of the upper portion 513 may be regarded as the ceiling surface (attachment surface). Further, the cell 5 does not necessarily have the foot parts 54. In this case, the workbench 52 may be directly installed in the installation space.

Robot

As shown in FIG. 2, the robot 1 has the base 11 and a robot arm 10. The robot arm 10 includes a first arm (n-th arm) 12, a second arm ((n+1)th arm) 13, a third arm 14, a fourth arm 15, a fifth arm 16, and a sixth arm 17 (six arms), and a first drive source 401, a second drive source 402, a third drive source 403, a fourth drive source 404, a fifth drive source 405, and a sixth drive source 406 (six drive sources). For example, an end effector such as a hand 91 that grasps a precision apparatus such as a wristwatch, a part, or the like may be detachably attached to the distal end of the sixth arm 17.

The robot 1 is a vertical articulated (six-axis) robot in which the base 11, the first arm 12, the second arm 13, the third arm 14, the fourth arm 15, the fifth arm 16, and the sixth arm 17 are coupled in this order from the proximal end side toward the distal end side. As below, the first arm 12, the second arm 13, the third arm 14, the fourth arm 15, the fifth arm 16, and the sixth arm 17 will be respectively also referred to as "arm". The first drive source 401, the second drive source 402, the third drive source 403, the fourth drive source 404, the fifth drive source 405, and the sixth drive source 406 will be respectively also referred to as "drive source (drive unit)".

As shown in FIG. 2, the base 11 is a part fixed (member attached) to the ceiling surface 531. The fixing method is not particularly limited, but a fixing method using a plurality of bolts or the like may be employed.

In the embodiment, a plate-like flange 111 provided in the lower part of the base 11 is attached to the ceiling surface 531, however, the attachment location of the base 11 to the ceiling surface 531 is not limited to that. For example, the location may be the upper surface of the base 11.

The base 11 may include a joint 171, which will be described later, or not (see FIG. 3).

As shown in FIG. 2, the robot arm 10 is rotatably supported with respect to the base 11 and the arms 12 to 17 are respectively supported to be independently displaceable with respect to the base 11.

The first arm 12 has a bending shape. The first arm 12 has a first portion 121 connected to the base 11 and extending downward in the vertical direction from the base 11, a second portion 122 extending in the horizontal direction from the lower end of the first portion 121, a third portion 123 provided on an opposite end of the second portion 122 to the first portion 121 and extending in the vertical direction, and a fourth portion 124 extending in the horizontal direction from the distal end of the third portion 123. These first portion 121, second portion 122, third portion 123, and fourth portion 124 are integrally formed. Further, the second portion 122 and the third portion 123 are nearly orthogonal (cross) as seen from the near side of the paper surface of FIG. 2 (in a front view orthogonal to both a first rotation shaft O1 and a second rotation shaft O2, which will be described later).

The second arm 13 has a longitudinal shape and is connected to the distal end of the first arm 12 (the opposite end of the fourth portion 124 to the third portion 123).

The third arm 14 has a longitudinal shape and is connected to the opposite end of the second arm 13 to the end to which the first arm 12 is connected.

The fourth arm 15 is connected to the opposite end of the third arm 14 to the end to which the second arm 13 is connected. The fourth arm 15 has a pair of supporting parts 151, 152 opposed to each other. The supporting parts 151, 152 are used for connection to the fifth arm 16.

The fifth arm 16 is located between the supporting parts 151, 152 and connected to the supporting parts 151, 152, and thereby, coupled to the fourth arm 15.

The sixth arm 17 has a flat plate shape and is connected to the distal end of the fifth arm 16. Further, the hand 91 is detachably attached to the distal end of the sixth arm 17 (the opposite end to the fifth arm 16). The hand 91 includes, but not particularly limited to, for example, a configuration having a plurality of finger portions (fingers).

Each of the exteriors of the above described respective arms 12 to 17 may be formed by a single member or a plurality of members.

Next, referring to FIGS. 2 and 3, the drive sources 401 to 406 with driving of these arms 12 to 17 will be explained. FIG. 3 shows the schematic view of the robot 1 as seen from the right side in FIG. 2. Further, FIG. 3 shows a state in which the arms 13 to 17 have been rotated from the state shown in FIG. 2.

As shown in FIG. 3, the base 11 and the first arm 12 are coupled via the joint 171. The joint 171 has a mechanism that rotatably supports the first arm 12 coupled to the base 11 with respect to the base 11. Thereby, the first arm 12 is rotatable around the first rotation shaft (an n-th rotation shaft) O1 in parallel to the vertical direction (about the first rotation shaft O1) with respect to the base 11. The first rotation shaft O1 is aligned with a normal of the ceiling surface 531 to which the base 11 is attached. Further, the first rotation shaft O1 is a rotation shaft on the most upstream side of the robot 1. The rotation about the first rotation shaft O1 is performed by driving of the first drive source 401 having a motor 401M. Further, the first drive source 401 is driven by the motor 401M and a cable (not shown), and the motor 401M is controlled by a robot control apparatus via a motor driver 301 electrically connected thereto. Note that the first drive source 401 may be adapted to transmit the drive power from the motor 401M by a reducer (not shown) provided with the motor 401M, or the reducer may be omitted.

The first arm 12 and the second arm 13 are coupled via a joint 172. The joint 172 has a mechanism that rotatably supports one of the first arm 12 and the second arm 13 coupled to each other with respect to the other. Thereby, the second arm 13 is rotatable around the second rotation shaft (an (n+1)th rotation shaft) O2 in parallel to the horizontal direction (about the second rotation shaft O2) with respect to the first arm 12. The second rotation shaft O2 is orthogonal to the first rotation shaft O1. The rotation about the second rotation shaft O2 is performed by driving of the second drive source 402 having a motor 402M. Further, the second drive source 402 is driven by the motor 402M and a cable (not shown), and the motor 402M is controlled by the robot control apparatus via a motor driver 302 electrically connected thereto. Note that the second drive source 402 may be adapted to transmit the drive power from the motor 402M by a reducer (not shown) provided with the motor 402M, or the reducer may be omitted. The second rotation shaft O2 may be parallel to the shaft orthogonal to the first rotation shaft O1, or the second rotation shaft O2 may be different in shaft direction from the first rotation shaft O1, not orthogonal thereto.

The second arm 13 and the third arm 14 are coupled via a joint 173. The joint 173 has a mechanism that rotatably supports one of the second arm 13 and the third arm 14 coupled to each other with respect to the other. Thereby, the third arm 14 is rotatable around a third rotation shaft O3 in parallel to the horizontal direction (about the third rotation shaft O3) with respect to the second arm 13. The third rotation shaft O3 is parallel to the second rotation shaft O2. The rotation about the third rotation shaft O3 is performed by driving of the third drive source 403. Further, the third drive source 403 is driven by a motor 403M and a cable (not shown), and the motor 403M is controlled by the robot control apparatus via a motor driver 303 electrically connected thereto. Note that the third drive source 403 may be adapted to transmit the drive power from the motor 403M by a reducer (not shown) provided with the motor 403M, or the reducer may be omitted.

The third arm 14 and the fourth arm 15 are coupled via a joint 174. The joint 174 has a mechanism that rotatably supports one of the third arm 14 and the fourth arm 15 coupled to each other with respect to the other. Thereby, the fourth arm 15 is rotatable around a fourth rotation shaft O4 in parallel to the center axis direction of the third arm 14 (about the fourth rotation shaft O4) with respect to the third arm 14. The fourth rotation shaft O4 is orthogonal to the third rotation shaft O3. The rotation about the fourth rotation shaft O4 is performed by driving of the fourth drive source 404. Further, the fourth drive source 404 is driven by a motor 404M and a cable (not shown), and the motor 404M is controlled by the robot control apparatus via a motor driver 304 electrically connected thereto. Note that the fourth drive source 404 may be adapted to transmit the drive power from the motor 404M by a reducer (not shown) provided with the motor 404M, or the reducer may be omitted. The fourth rotation shaft O4 may be parallel to the shaft orthogonal to the third rotation shaft O3, or the fourth rotation shaft O4 may be different in shaft direction from the third rotation shaft O3, not orthogonal thereto.

The fourth arm 15 and the fifth arm 16 are coupled via a joint 175. The joint 175 has a mechanism that rotatably supports one of the fourth arm 15 and the fifth arm 16 coupled to each other with respect to the other. Thereby, the fifth arm 16 is rotatable around a fifth rotation shaft O5 orthogonal to the center axis direction of the fourth arm 15 (about the fifth rotation shaft O5) with respect to the fourth arm 15. The fifth rotation shaft O5 is orthogonal to the fourth rotation shaft O4. The rotation about the fifth rotation shaft O5 is performed by driving of the fifth drive source 405. Further, the fifth drive source 405 is driven by a motor 405M and a cable (not shown), and the motor 405M is controlled by the robot control apparatus via a motor driver 305 electrically connected thereto. Note that the fifth drive source 405 may be adapted to transmit the drive power from the motor 405M by a reducer (not shown) provided with the motor 405M, or the reducer may be omitted. The fifth rotation shaft O5 may be parallel to the shaft orthogonal to the fourth rotation shaft O4, or the fifth rotation shaft O5 may be different in shaft direction from the fourth rotation shaft O4, not orthogonal thereto.

The fifth arm 16 and the sixth arm 17 are coupled via a joint 176. The joint 176 has a mechanism that rotatably supports one of the fifth arm 16 and the sixth arm 17 coupled to each other with respect to the other. Thereby, the sixth arm 17 is rotatable around the sixth rotation shaft O6 (about the sixth rotation shaft O6) with respect to the fifth arm 16. The sixth rotation shaft O6 is orthogonal to the fifth rotation shaft O5. The rotation about the sixth rotation shaft O6 is performed by driving of the sixth drive source 406. Further, the sixth drive source 406 is driven by a motor 406M and a cable (not shown), and the motor 406M is controlled by the robot control apparatus via a motor driver 306 electrically connected thereto. Note that the sixth drive source 406 may be adapted to transmit the drive power from the motor 406M by a reducer (not shown) provided with the motor 406M, or the reducer may be omitted. The fifth rotation shaft O5 may be parallel to the shaft orthogonal to the fourth rotation shaft O4, the sixth rotation shaft O6 may be parallel to the shaft orthogonal to the fifth rotation shaft O5, or the sixth rotation shaft O6 may be different in shaft direction from the fifth rotation shaft O5, not orthogonal thereto.

The robot 1 driving in the above described manner controls the actions of the arms 12 to 17, etc. while grasping a precision apparatus, a part, or the like with the hand 91 connected to the distal end of the sixth arm 17, and thereby, may perform respective work of carrying the precision apparatus, the part, or the like. The driving of the hand 91 is controlled by the robot control apparatus.

As above, the configuration of the robot 1 is briefly explained.

Next, referring to FIGS. 4, 5, and 6A to 6E, the relationships among the arms 12 to 17 will be explained, and the explanation will be made from various viewpoints while the expressions, etc. are changed. Further, the third arm 14, the fourth arm 15, the fifth arm 16, and the sixth arm 17 are considered in a condition that they are stretched straight, in other words, in a condition that the fourth rotation shaft O4 and the sixth rotation shaft O6 are aligned or in parallel as shown in FIGS. 4 and 5.

First, as shown in FIG. 4, a length L1 of the first arm 12 is set to be longer than a length L2 of the second arm 13.

Here, the length L1 of the first arm 12 is a distance between the second rotation shaft O2 and a center line 611 extending in the leftward and rightward directions in FIG. 4 of a bearing part 61 (a member of the joint 171) that rotatably supports the first arm 12 as seen from the shaft direction of the second rotation shaft O2. Further, the length L2 of the second arm 13 is a distance between the second rotation shaft O2 and the third rotation shaft O3 as seen from the shaft direction of the second rotation shaft O2.

Further, as shown in FIG. 5, the robot 1 is adapted so that an angle θ formed between the first arm 12 and the second arm 13 may be 0° as seen from the shaft direction of the second rotation shaft O2. That is, the robot 1 is adapted so that the first arm 12 and the second arm 13 may overlap as seen from the shaft direction of the second rotation shaft O2. The second arm 13 is adapted so that, when the angle θ is 0°, i.e., the first arm 12 and the second arm 13 overlap as seen from the shaft direction of the second rotation shaft O2, the second arm 13 may not interfere with the second portion 122 of the first arm 12 and the ceiling surface 531.

Here, the angle θ formed by the first arm 12 and the second arm 13 is an angle formed by a straight line passing through the second rotation shaft O2 and the third rotation shaft O3 (a center axis of the second arm 13 as seen from the shaft direction of the second rotation shaft O2) 621 and the first rotation shaft O1 as seen from the shaft direction of the second rotation shaft O2 (see FIG. 4).

Furthermore, as shown in FIG. 5, the robot 1 is adapted so that the second arm 13 and the third arm 14 may overlap as seen from the shaft direction of the second rotation shaft O2. That is, the robot 1 is adapted so that the first arm 12, the second arm 13, and the third arm 14 may overlap at the same time as seen from the shaft direction of the second rotation shaft O2.

A total length L3 of the third arm 14, the fourth arm 15, the fifth arm 16, and the sixth arm 17 is set to be longer than the length L2 of the second arm 13. Thereby, as seen from the shaft direction of the second rotation shaft O2, when the second arm 13 and the third arm 14 are overlapped, the distal end from the second arm 13 to the robot arm. 10, i.e., the distal end of the sixth arm 17 may be protruded from the second arm 13. Therefore, the hand 91 may be prevented from interfering with the first arm 12 and the second arm 13.

Here, the total length L3 of the third arm 14, the fourth arm 15, the fifth arm 16, and the sixth arm 17 is a distance between the third rotation shaft O3 and the distal end of the sixth arm 17 as seen from the shaft direction of the second rotation shaft O2 (see FIG. 5). In this case, regarding the third arm 14, the fourth arm 15, the fifth arm 16, and the sixth arm 17, the fourth rotation shaft O4 and the sixth rotation shaft O6 are aligned or in parallel as shown in FIG. 5.

Figures 6A, 6B, 6C, 6D, 6E:
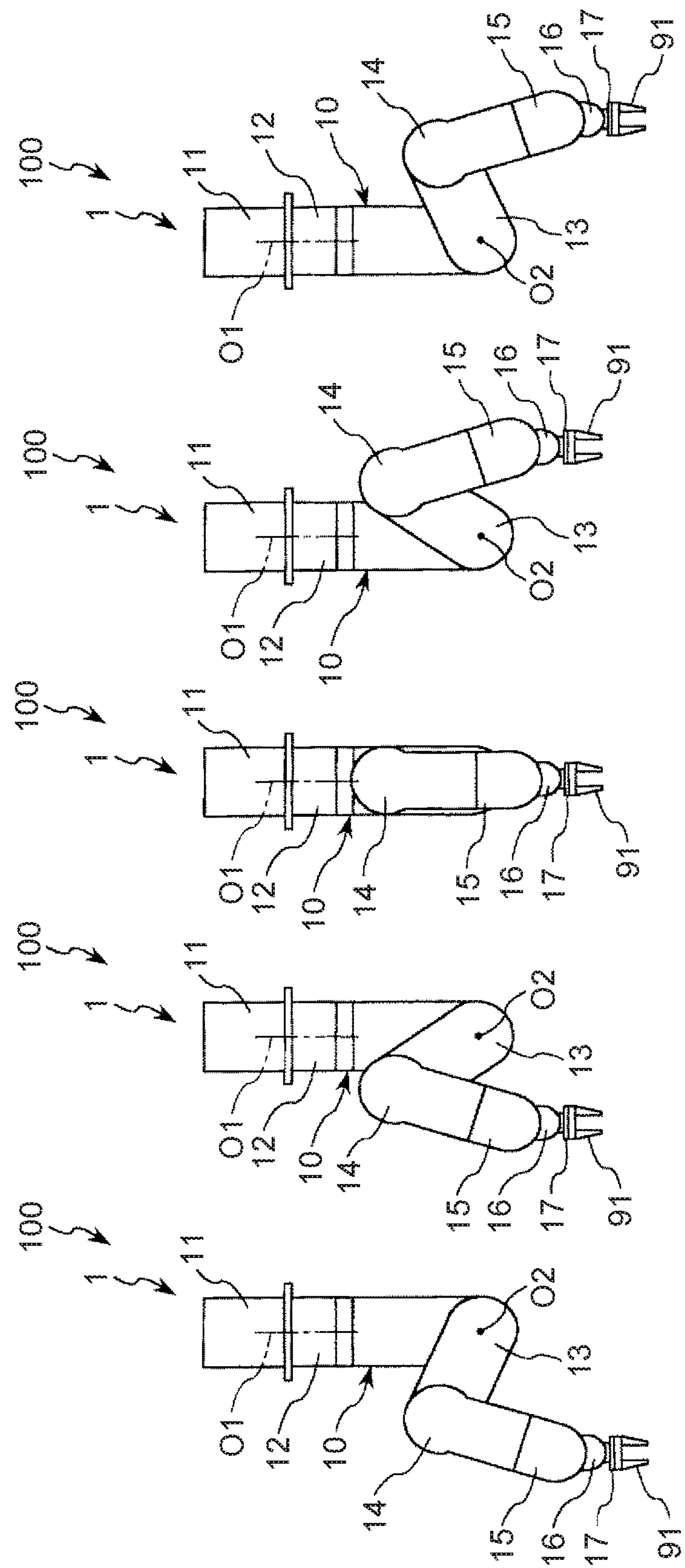
FIGS. 6A to 6E are diagrams for explanation of actions of the robot shown in FIG. 1.

In the robot 1, as shown in FIGS. 6A, 6B, 6C, 6D, 6E, by rotation of the second arm 13 without rotation of the first arm 12, the distal end of the second arm 13 may be moved to a position different by 180° about the first rotation shaft O1 through the state in which the angle θ is 0° as seen from the shaft direction of the second rotation shaft O2. Accordingly, the distal end of the robot arm 10 (the distal end of the sixth arm 17) may be moved from a position (first position) shown in FIG. 6A to a position (second position) shown in FIG. 6E different by 180° about the first rotation shaft O1 from the position shown in FIG. 6A through the state in which the first arm 12 and the second arm 13 overlap as shown in FIG. 6C. Thereby, the hand 91 (the distal end of the robot arm 10) may be moved on a straight line as seen from the shaft direction of the first rotation shaft O1. Note that, in the movement, the third arm 14, the fourth arm 15, the fifth arm 16, and the sixth arm 17 are respectively rotated as appropriate.

Next, referring to FIGS. 6A to 6E, 7, and 8, examples of work performed by the robot 1 and actions of the robot 1 at the work will be explained. Here, the actions of the robot 1 when the robot 1 performs assembly work of incorporating a part (work) 41 placed in a part supply portion 71 in a part (work) 42 placed in a part placement portion 72 is explained. Although the part supply portion 71 and the part placement portion 72 are not shown in FIG. 1, the portions are provided on the work surface 521 as shown in FIGS. 7 and 8.

First, as shown in FIG. 7, the robot 1 grasps the part 41 placed in the part supply portion 71 with the hand 91.

Then, the robot 1 moves the hand 91 to a position different by 180° about the first rotation shaft O1 through the state in which the angle θ formed by the first arm 12 and the second arm 13 is 0° as seen from the shaft direction of the second rotation shaft O2 by rotating the second arm 13 and the third arm 14 without rotating the first arm 12 from the state in which the second arm 13 is not aligned with the first arm 12 as shown in FIG. 7 (see FIGS. 6A to 6E). Thereby, the part 41 grasped by the hand 91 is moved onto the part placement portion 72. In this regard, as fine adjustment, an arbitrary arm of the first arm 12, the fifth arm 16, and the sixth arm 17 may be rotated.

Then, the robot 1 incorporates the part 41 in the part 42 on the part placement portion 72.

In this manner, the work of incorporating the part 41 in the part 42 may be performed by the robot 1. Further, the robot 1 may perform reverse actions to the above described actions, i.e., the actions of moving the hand 91 located on the part placement portion 72 to the part supply portion 71. Then, the robot 1 may repeat the work of incorporating the part 41 in the part 42.

By the driving of the robot arm 10, as shown in FIG. 8, the robot 1 may perform the actions of moving the hand 91 as shown by an arrow 56 without actions of moving the hand 91 as shown by arrows 57, 58. That is, the robot 1 may perform actions of moving the hand 91 (the distal end of the robot arm 10) on a straight line as seen from the shaft direction of the first rotation shaft O1. Thereby, the space for preventing the robot 1 from interfering may be made smaller, and the cell 5 may be downsized. Accordingly, the area of the installation space for installation of the robot cell 50 (installation area), i.e., the area S of the cell 5 as seen from the vertical direction may be made smaller than that in related art.

Specifically, the area S is less than 637,500 $mm^2$, preferably less than 500,000 $mm^2$, more preferably less than 400,000 $mm^2$, and even more preferably 360,000 $mm^2$ or less. As described above, the robot 1 may perform those actions, and thus, even in the area S, the robot arm 10 may be driven not to interfere with the cell 5.

The area S less than the upper limit is nearly equal to or less than the size of the work area in which a human works. Accordingly, when the area S is less than the upper limit, for example, replacement of a human by the robot cell 50 may be easily performed. Note that the reverse change to the above described change, i.e., replacement of the robot cell 50 by a human may be easily made. Further, the area S is preferably 10,000 $mm^2$ or more. Thereby, the maintenance inside the robot cell 50 may be easily performed.

The replacement may be easily performed, and thereby, for example, a manufacturing line 1000 in which humans 500 are arranged around a conveyer with support 70 that carries parts (not shown) as shown in FIGS. 9A and 10A may be easily changed to a manufacturing line 1000 in which humans 500 and the robot cells 50 coexist around a conveyer with support 70 as shown in FIGS. 9B and 10B. Further, the replacement is easy, and thereby, the manufacturing line 1000 may be changed without changes in the respective arrangements of the conveyer with support 70 and the humans 500 and the position relationships among them. Furthermore, the replacement is easy, and thereby, the line may be changed to the manufacturing line 1000 in which the humans 500 and the robot cells 50 coexist regardless of the number of replacements and the locations of replacements.

As described above, using the robot system 100 having the robot cell 50 with the area S less than the upper limit, the manufacturing line 1000 may be easily changed without major change of changing the entire manufacturing line 1000. Further, even when the humans 500 are replaced by the robot cells 500, the longer length of the manufacturing line 1000 may be suppressed.

Since the area S may be made smaller, as shown in FIG. 8, the width W of the cell 5 may be made smaller than the width WX in related art, specifically, for example, 80% of the width WX in related art or less. Note that, in the embodiment, the cell 5 has a square shape as seen from the vertical direction. Accordingly, in the embodiment, the width (depth) W of the cell 5 in the upward and downward directions in FIG. 8 and the width (lateral width) W of the cell in the leftward and rightward directions in FIG. 8 are the same, however, they may be different. In this case, one of the widths W may be reduced to, for example, 80% of the width WX in related art or less.

Specifically, the width W is preferably less than 850 mm, more preferably less than 750 mm, and even more preferably 650 mm or less (see FIGS. 8 and 11). Thereby, the same advantages as the above described advantages may be sufficiently exerted. Note that the width W is an average width of the cells 5. Note that the width W is preferably 100 mm or more. Thereby, the maintenance inside the robot cell 50 may be easily performed.

Further, as described above, the robot 1 may move the hand 91 with little change of the height of the distal end of the robot arm 10 (at the nearly constant height). Accordingly, the height of the cell 5 (the length in the vertical direction) L may be made lower than the height in related art (see FIG. 11). Specifically, the height L of the cell 5 may be reduced to. for example, 80% of the height in related art or less.

Thereby, the ceiling surface 531 may be made lower and the position of the center of gravity of the robot 1 may be made lower. Accordingly, the vibration generated by the actions of the robot 1 may be reduced.

Specifically, the height L is preferably 1,700 mm or less, more preferably from 1,000 mm to 1,650 mm. When the height is equal to or less than the upper limit, the influence of the vibration when the robot 1 acts within the cell 5 may be further suppressed. Alternatively, when the height is equal to or more than the lower limit, the interference of the robot 1 with, for example, the work surface 521 may be avoided. Note that the height L is an average height of the cells 5 (including the foot parts 54).

Next, installation of the robot cell 50 in a target installation position near the conveyer with support 70 in the manufacturing line 1000 will be explained.

The cell 5 shown in FIG. 11 may be lifted and carried by a carrier apparatus such as a forklift (not shown). Thereby, the cell 5 may be carried and installed near the conveyer with support 70. Note that the conveyer with support 70 has a conveyer 73 that carries parts or the like, a supporting frame 741 that supports the conveyer 73, and a plurality of supporting legs 742 connected to the supporting frame 741 for installation of the conveyer with support 70 on the ground or the like.

Four positioning parts 81 are provided in the robot cell 50 so that the robot cell 50 may be installed more easily when the cell 5 is installed near the conveyer with support 70 as described above.

As shown in FIGS. 11, 12A, and 12B, the four positioning parts 81 are provided in the respective corners of a side surface 525 facing the conveyer with support 70 (a side surface on the near side of the paper surface in FIG. 11) of the four side surfaces of the workbench 52. The positioning part 81 includes a pair of plate members 811*a*, 811*b* projected from the workbench 52. These plate members 811*a*, 811*b* are separated from each other by the width of the supporting leg 742 (the length as seen from the vertical direction). Thereby, the supporting leg 742 may be sandwiched by the plate members 811*a*, 811*b* as seen from the vertical direction.

The positioning parts 81 are provided, and thereby, the robot cell 50 may be placed in the target installation position near the conveyer with support 70 more easily. Accordingly, the above described replacement of the human 500 by the robot cell 50 may be performed more easily. Further, the supporting legs 742 may be sandwiched by the plate members 811*a*, 811*b* as seen from the vertical direction, and thereby, the movement of the robot cell 50 in the upward and downward directions (the movement in the longitudinal direction of the manufacturing line) in FIG. 12A may be restricted.

Note that, in the embodiment, the four positioning parts 81 are provided, however, the number of positioning parts 81 is not particularly limited, but arbitrary. Further, the positioning part 81 includes the plate members 811*a*, 811*b*, however, for example, may include only one of the plate members 811*a*, 811*b*. The configuration of the positioning part 81 is not limited to the configuration shown in FIGS. 12A and 12B. For example, a convex member may be provided on the robot cell 50 and a concave member corresponding to the convex member may be provided on the conveyer with support 70. Or, the concave member may be provided on the robot cell 50 and the convex member may be provided on the conveyer with support 70. The robot cell 50 may be positioned by fitting of the concave member and the convex member.

Further, as described above, the robot cell 50 can be carried by the carrier apparatus such as a forklift, however, wheels (not shown) may be provided on the robot cell 50 so that the cell may be movable by the wheels. Or, the robot cell 50 may be formed to be self-propellant. In this case, it is preferable that the robot system 100 has a movement mechanism (not shown) that moves the robot cell 50, a movement control unit (not shown) that controls driving of the movement mechanism, and a position detection unit (not shown) that grasps the position of the robot cell 50. Note that the movement mechanism includes, for example, a configuration having rollers (wheels) and motors (drive parts) or the like for moving the robot cell 50. Further, the movement control unit includes, for example, a configuration having a personal computer containing a CPU or the like. Furthermore, the position detection unit includes, for example, an imaging unit such as an electronic camera, an optical sensor, or the like. Note that the position detection unit may be provided in the robot cell 50 or the conveyer with support 70. Further, the position detection unit may be provided in another location than the conveyer with support 70 or the robot cell 50 as long as it can grasp positions of both the robot cell 50 and the conveyer with support 70. By the configuration, the relative position of the robot cell 50 to the conveyer with support 70 is detected by the position detection unit and driving of the movement mechanism is controlled by the movement control unit based on the detection result. Thereby, the robot cell 50 may be self-propelled to the target installation position. According to the configuration, the robot cell 50 may be moved and placed into the target installation position more easily, and thus, replacement of the human 500 by the robot cell 50 may be performed more easily.

Second Embodiment

Figure 13A:
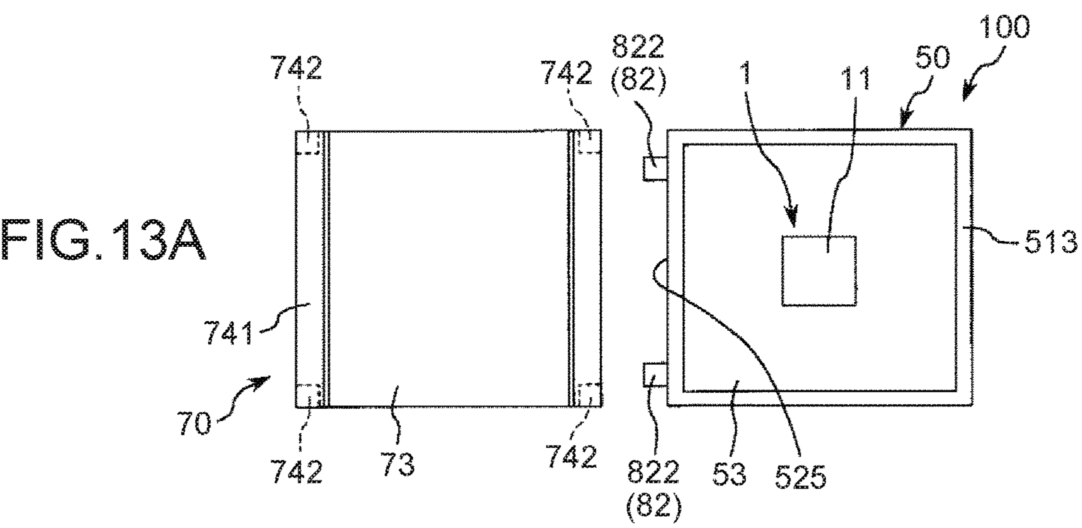
FIGS. 13A and 13B show the second embodiment of the robot system according to the invention.
Figure 13B:
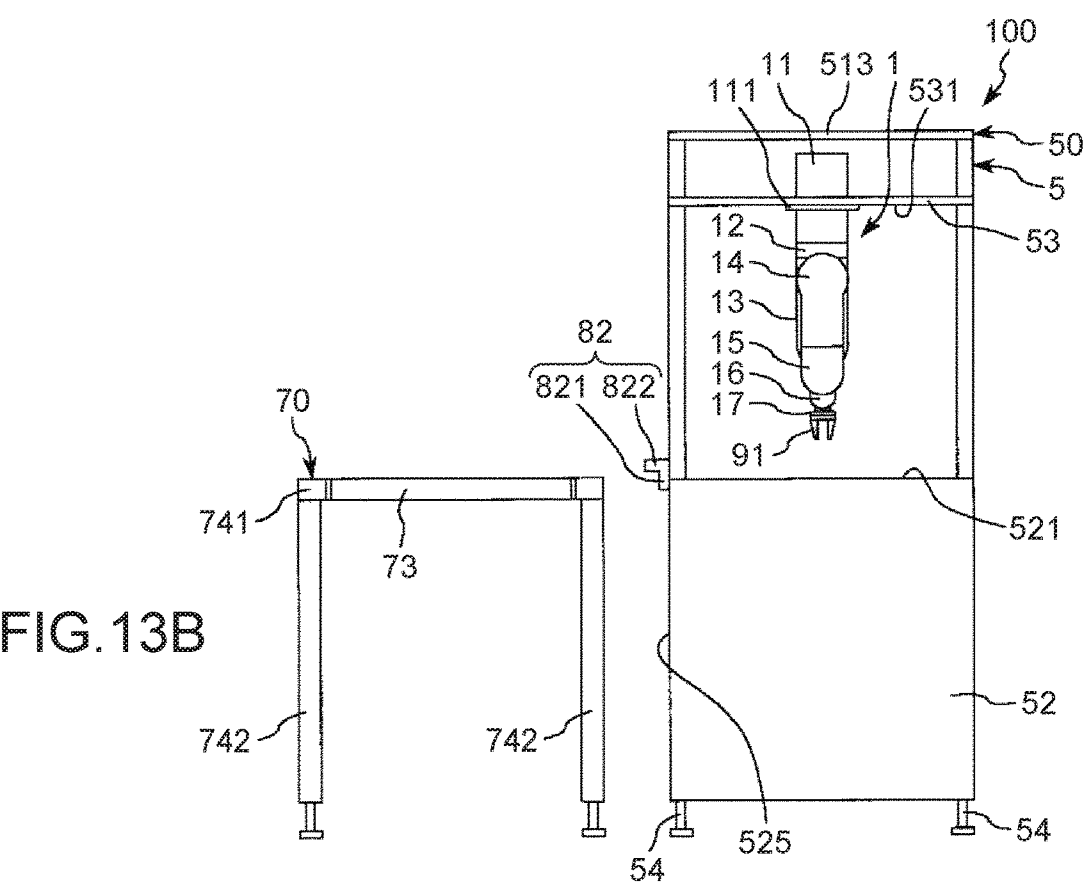

FIGS. 13A and 13B show the second embodiment of the robot system according to the invention. FIG. 13A shows a top view and FIG. 13B shows a side view. Further, FIGS. 13A and 13B correspond to FIGS. 12A and 12B and show the conveyer with support with the robot system.

As below, the second embodiment will be explained with reference to the drawings and the explanation will be made with focus on differences from the above described embodiment and the explanation of the same items will be omitted.

The robot system of the embodiment is the same as the above described embodiment except that the configuration of the positioning part is different.

Positioning parts 82 of the robot system 100 shown in FIGS. 13A and 13B are provided in upper corner parts of the side surface 525 of the workbench 52.

The positioning part 82 has a shape bending in an L-shape in a side view. The positioning part 82 extends along the vertical direction and has a portion 821 fixedly provided to the workbench 52 and a portion 822 extending from the workbench 52 along the horizontal direction. Further, the height of the portion 822 is higher than the height of the supporting frame 741.

The positioning parts 82 function as marks when the robot cell 50 is placed near the conveyer with support 70. For example, the robot cell 50 is installed while checking the positions of the portions 822 with respect to the supporting legs 742 of the conveyer with support 70, and thereby, the robot cell 50 may be installed in the target installation position near the conveyer with support 70 more easily.

The marks for grasping the target installation position may be provided on the conveyer with support 70. When the positioning parts 82 are provided as the marks for the target position, the configuration of the positioning parts 82 is not limited to the configuration shown in FIGS. 13A and 13B, but is any configuration as long as it may exert the function as the marks.

According to the second embodiment, the same advantages as those of the above described first embodiment may be exerted.

As above, the robot system according to the invention is explained according to the illustrated embodiments, however, the invention is not limited to those and the configurations of the respective parts may be replaced by arbitrary configurations having the same functions. Further, other arbitrary configurations may be added. Furthermore, the invention may include a combination of two or more arbitrary configurations (features) of the above described respective embodiments.

In the above described embodiments, the number of rotation shafts of the robot arm of the robot is six, however, the invention is not limited to that. The number of rotation shafts of the robot arm may be, for example, two, three, four, five, or seven or more. Further, in the above described embodiments, the number of arms of the robot is six, however, the invention is not limited to that. The number of arms of the robot may be, for example, two, three, four, five, or seven or more.

In the above described embodiments, the number of robot arms of the robot is one, however, the invention is not limited to that. The number of robot arms of the robot may be, for example, two or more. That is, the robot may be, for example, a multi-arm robot including a dual-arm robot.

In the above described embodiments, the form having one robot within the single cell is explained, however, the number of robots placed within the single cell includes, but not limited to, two or more.

In the above described embodiments, the attachment surface as the location to which the base of the robot is fixed is the ceiling surface, however, the attachment surface is not limited to that. The attachment surface may be, for example, the upper surface of the ceiling part, the lower surface or the upper surface in the upper part of the frame body, the post part, the work surface, or the like.

Further, in the above described embodiments, regarding conditions (relationships) of an n-th rotation shaft, an n-th arm, an (n+1)th rotation shaft, and an (n+1)th arm defined in the appended claims, the case where n is one, i.e., the case where the first rotation shaft, the first arm, the second rotation shaft, and the second arm satisfy the conditions is explained, however, the invention is not limited to that. The n may be an integer number of one or more, and the same conditions as those in the case where n is one may be satisfied with respect to an arbitrary integer number equal to or more than one. Therefore, for example, the case where n is two, i.e., the case where the second rotation shaft, the second arm, the third rotation shaft, and the third arm may satisfy the same conditions as those in the case where n is one, the case where n is three, i.e., the case where the third rotation shaft, the third arm, the fourth rotation shaft, and the fourth arm may satisfy the same conditions as those in the case where n is one, the case where n is four, i.e., the case where the fourth rotation shaft, the fourth arm, the fifth rotation shaft, and the fifth arm may satisfy the same conditions as those in the case where n is one, or, the case where n is five, i.e., the case where the fifth rotation shaft, the fifth arm, the sixth rotation shaft, and the sixth arm may satisfy the same conditions as those in the case where n is one.

Further, in the above described embodiments, the vertical articulated robot is taken as an example for explanation, however, the robot of the robot system according to the invention is not limited to that. For example, the robot may be a robot having any configuration including a horizontal articulated robot.

Furthermore, in the above described embodiments, the manufacturing line including the conveyer with support as the apparatus for carrying the parts or the like is explained, however, the apparatus for carrying the parts or the like is not limited to that.

The entire disclosure of Japanese Patent Application No. 2015-071201, filed Mar. 31, 2015 is expressly incorporated by reference herein.

What is claimed is:

1. A robot system comprising a robot cell including a robot and a cell in which the robot is provided, wherein the cell includes a bench defining a work surface and a ceiling opposite the work surface, the robot hangs from the ceiling of the cell, and has a first arm rotatable about a first rotation shaft that defines a first shaft direction and a second arm provided on the first arm that is rotatable about a second rotation shaft that defines a second shaft direction, the second shaft direction being different from the first shaft direction, and the second arm being configured to rotate about the second rotation shaft such that the second arm overlaps the first arm when viewed along the second shaft direction, a third arm attached to the second arm and configured to rotate about a third rotation shaft that defines a third shaft direction that is parallel with the second shaft direction, a fourth arm attached to the third arm and configured to rotate about a fourth rotation shaft that defines a fourth shaft direction that is parallel with the first shaft direction, a fifth arm attached to the fourth arm and configured to rotate about a fifth rotation shaft that defines a fifth shaft direction that is parallel to the second shaft direction, and a sixth arm attached to the fifth arm and configured to rotate about a sixth rotation shaft that defines a sixth shaft direction that is parallel to the first shaft direction, the first arm includes a first branch extending in a first direction and a second branch extending in a second direction different from the first direction, an installation area of the robot cell is less than 637,500 mm2, the robot cell is movable, the first and second branches are integrally formed so as to be fixed relative to one another, the first and second branches rotate together around the first rotation shaft, and the first and second directions are angled relative to each other.

2. The robot system according to claim 1, wherein a length of the first arm is longer than a length of the second arm.

3. The robot system according to claim 2, wherein the robot includes a base provided in the ceiling of the cell, and the first arm is provided on the base.

4. The robot system according to claim 1, wherein the installation area is less than 500,000 $mm^2$.

5. The robot system according to claim 1, wherein the installation area is less than 400,000 $mm^2$.

6. The robot system according to claim 1, wherein a positioning part that determines a position of the robot cell with respect to a target installation position of the robot cell is provided in the robot cell.

7. The robot system according to claim 1, further comprising:

a movement mechanism that moves the robot cell; and a movement control unit that controls driving of the movement mechanism.

8. The robot system according to claim 1, wherein the first and second directions are orthogonal to each other.

9. The robot system according to claim 1, wherein the first direction is parallel to the second shaft direction.

* * * * *